June 12, 1962 W. A. MERCK ETAL 3,038,523
APPARATUS FOR CONTINUOUSLY PRODUCING BRAIDED ELASTOMERIC HOSE
Filed Feb. 12, 1959 5 Sheets-Sheet 3
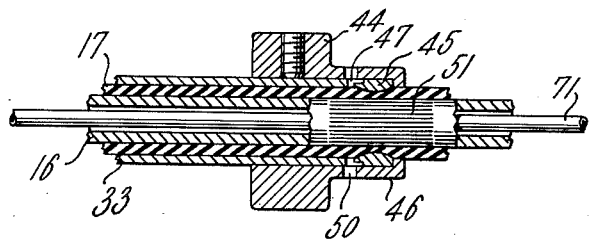
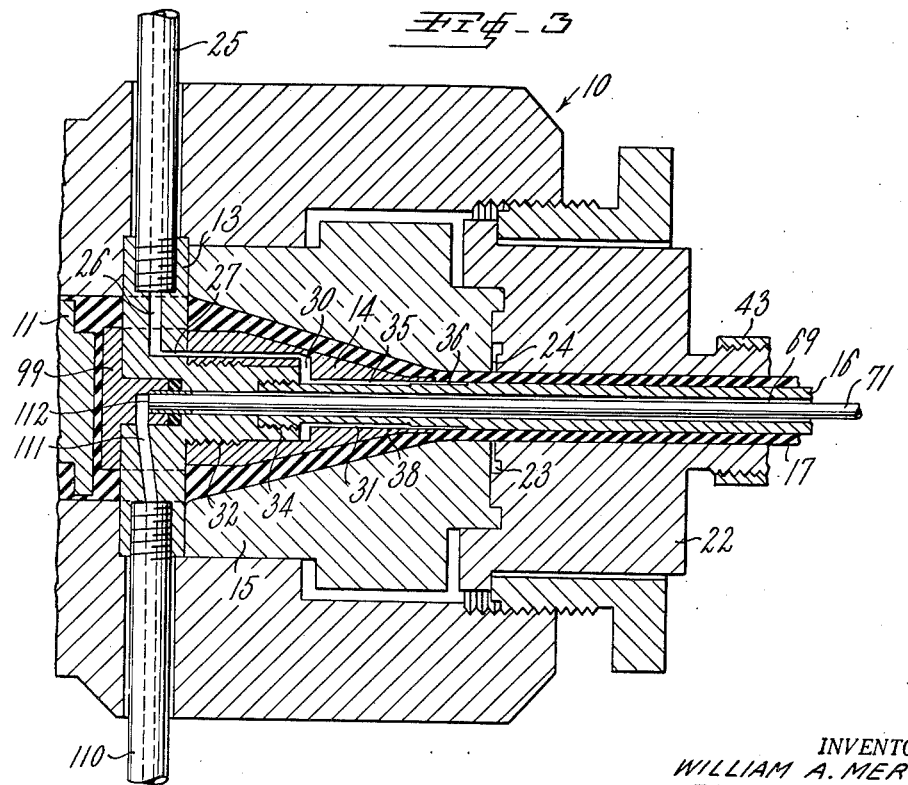
INVENTORS
WILLIAM A. MERCK
BY THOMAS J. RHODES
ATTORNEY

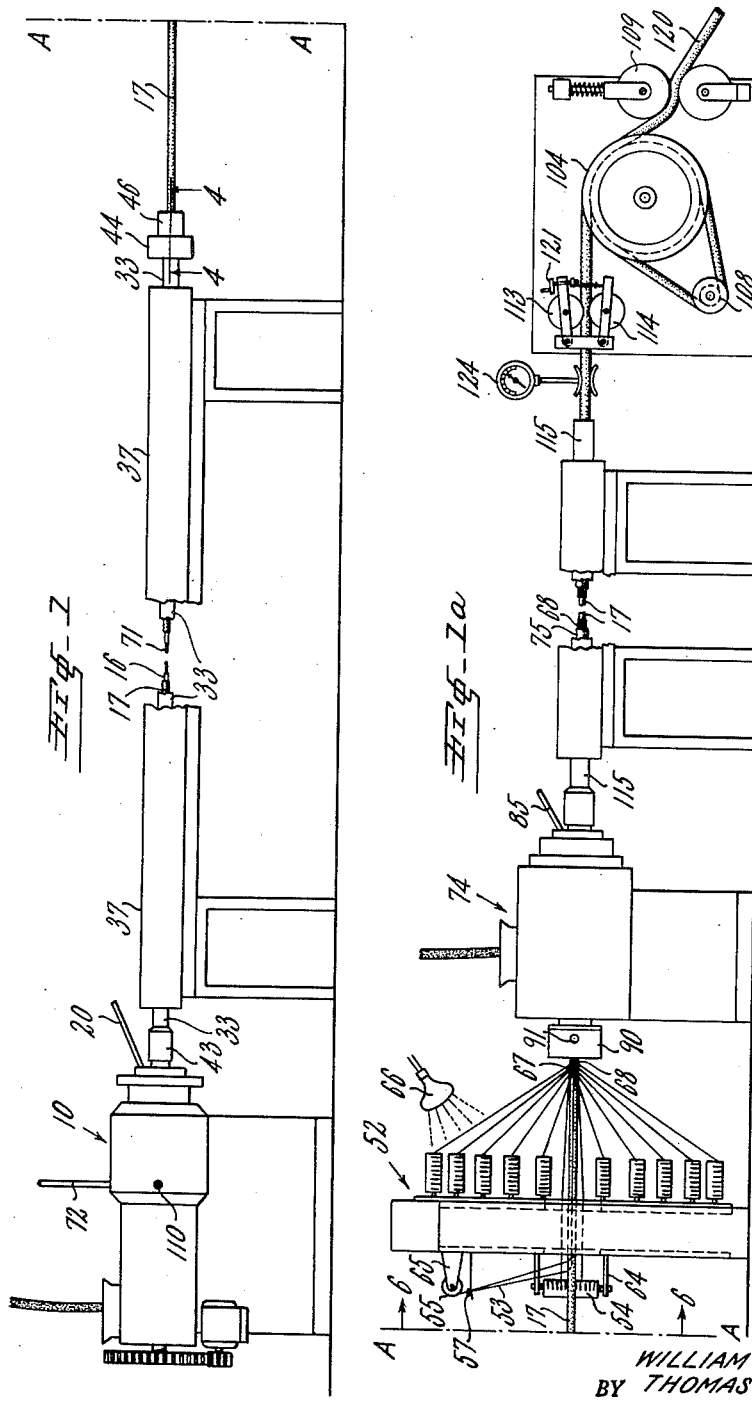

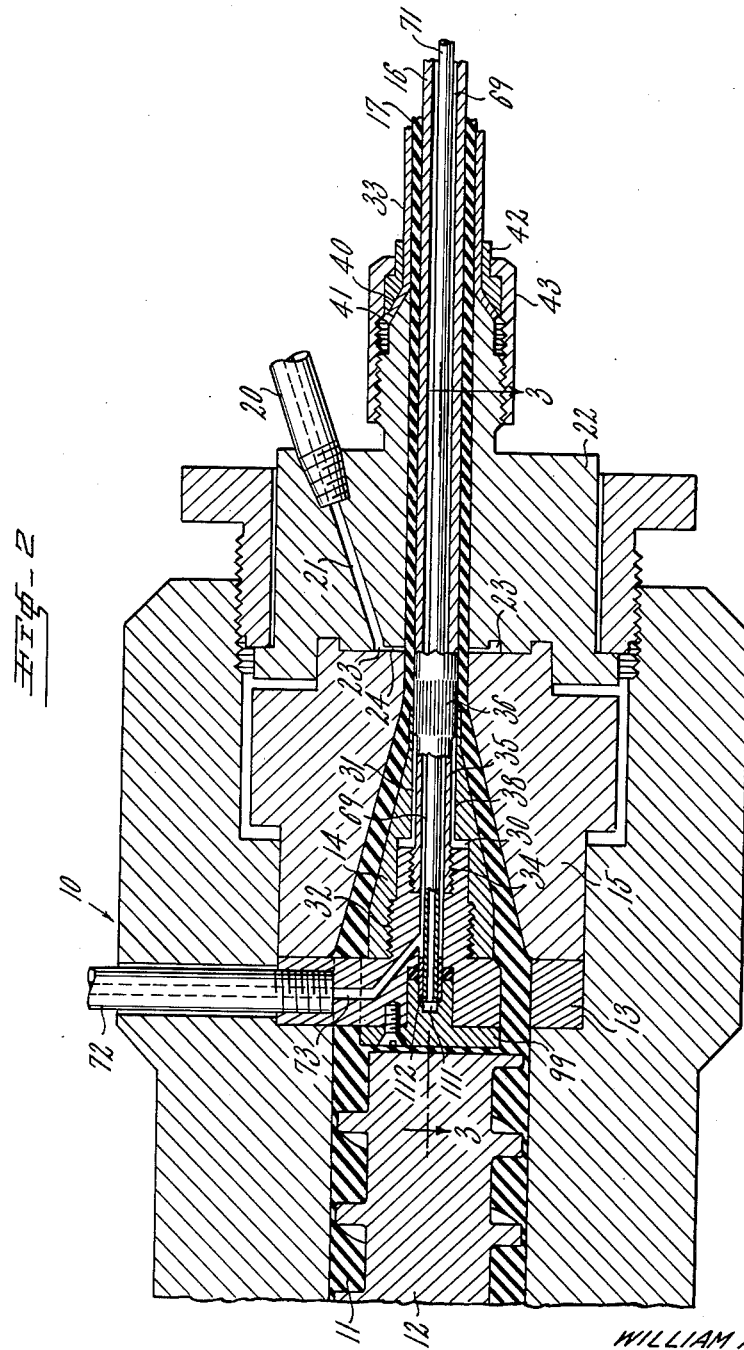

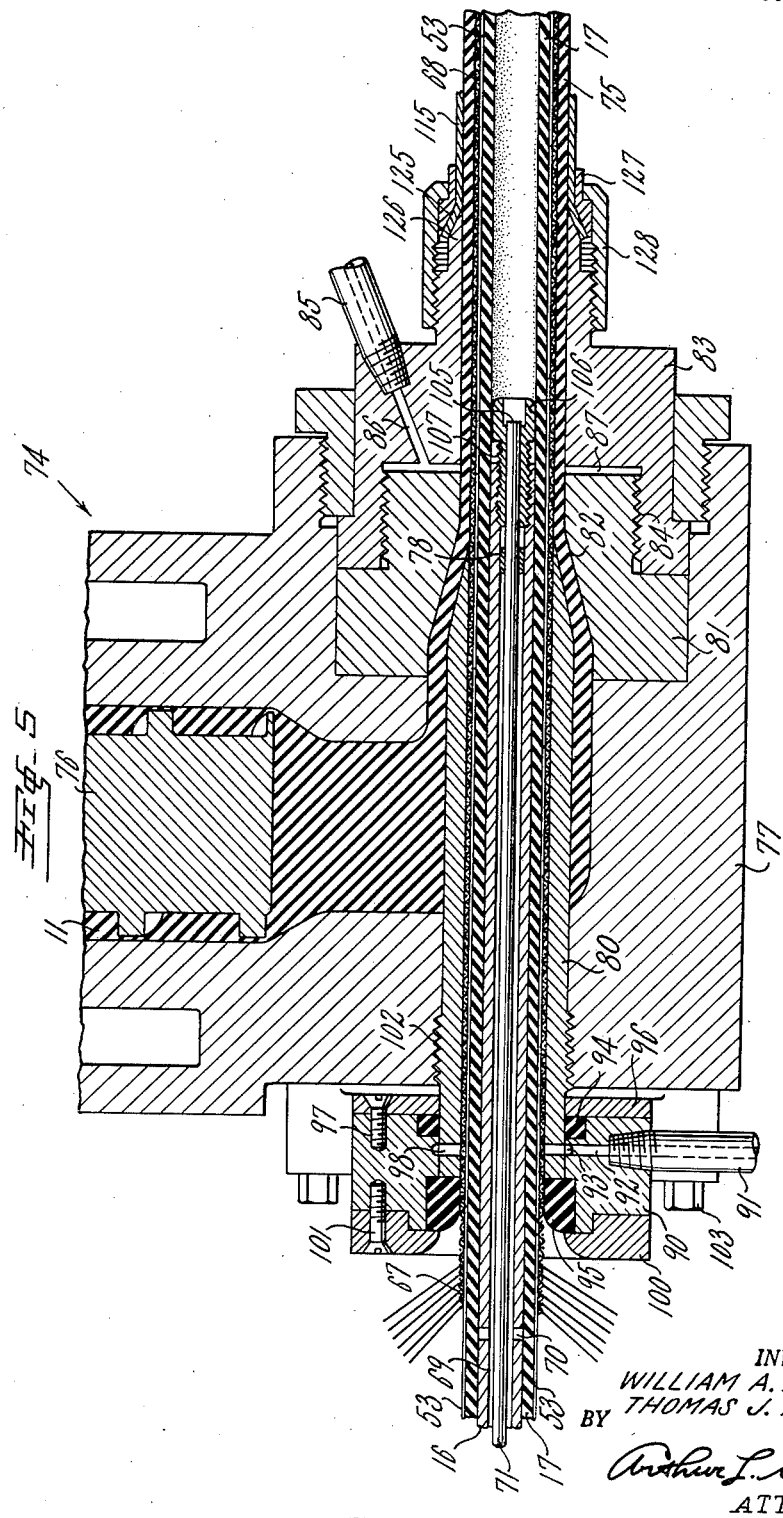

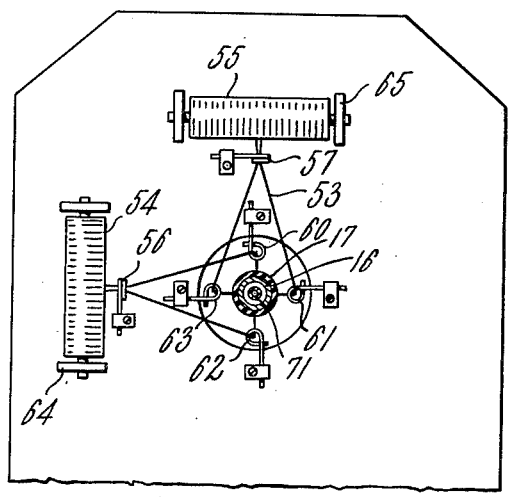
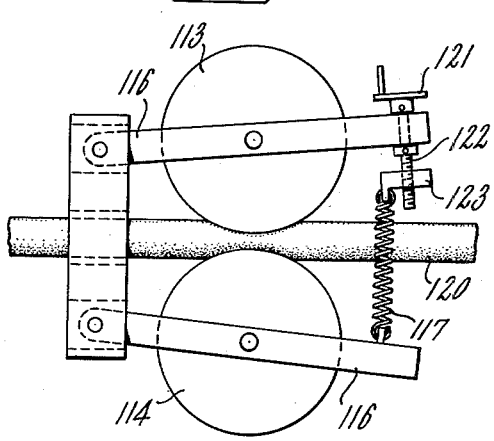
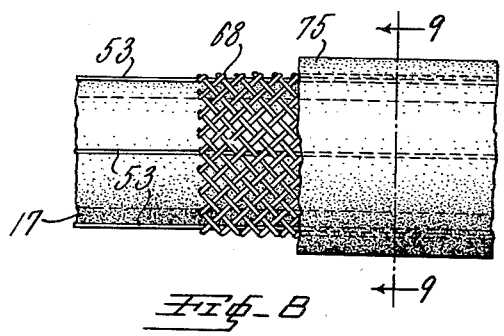
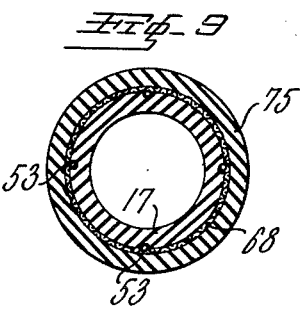

United States Patent Office 3,038,523
Patented June 12, 1962

3,038,523
APPARATUS FOR CONTINUOUSLY PRODUCING BRAIDED ELASTOMERIC HOSE
William A. Merck, Rutherford, and Thomas J. Rhodes, Kinnelon Borough, N.J., assignors to United States Rubber Company, New York, N.Y., a corporation of New Jersey
Filed Feb. 12, 1959, Ser. No. 792,877
7 Claims. (Cl. 156—393)

This invention relates to a method and apparatus for the continuous extrusion and cure of braided reinforced hose made from elastomeric material.

While there have been previous attempts to form reinforced hose from elastomeric material continuously, such attempts generally have been limited to the production of very long but nevertheless finite lengths of hose. Fully automatic, continuous braided hose production thus has not been achieved.

It is the primary object of the present invention to produce such braided hose continuously, with no shutdowns necessary at any time. Such a continuous process will eliminate the many separate operations now required which are costly in time and labor and which result in the manufacture of braided hose limited as to length.

In accordance with this object, we have invented a method and apparatus for continuously producing braided hose. Broadly, our method comprises extruding a layer of elastomeric material on a rigid mandrel, partially curing this layer, applying a plurality of longitudinal reinforcing cords along the periphery of this layer and subsequently applying braided reinforcing cord thereover. Following the application of the braid, the thus reinforced layer is pulled to achieve a uniform rate of travel while we extrude a second layer of elastomeric material thereover, the resulting product being supported internally by means of fluid pressure. Finally, we cure the resulting product to form a continuous length of integrally bonded braided hose.

Our apparatus comprises an extruder for extruding a layer of hose material on a rigid mandrel, a curing tube for partially curing the layer so formed, means to apply longitudinal reinforcing cords along the periphery of the layer, a conventional braider for applying braid over the partially cured layer, means to pull the thus reinforced layer at a uniform rate of travel through a second extruder capable of extruding an outer layer onto the product, and means to introduce fluid under pressure into the interior of the resulting product to support the inner surface thereof during final curing. Our apparatus is thus capable of producing unlimited lengths of integrally bonded braided hose.

A continuous hose-making apparatus constructed according to the present invention is illustrated in the accompanying drawings, wherein:

FIG. 1 is a side-elevational view of our continuous braided hose-making apparatus, broken on line A—A;

FIG. 1a is a continuation of the view of FIG. 1, commencing on line A—A;

FIG. 2 is a vertical sectional view through the extruder head of FIG. 1;

FIG. 3 is a horizontal sectional view taken on line 3—3 of FIG. 2;

FIG. 4 is a horizontal sectional view taken on line 4—4 of FIG. 1;

FIG. 5 is a vertical sectional view through the extruder head of FIG. 1a;

FIG. 6 is an elevational view taken on line 6—6 of FIG. 1a;

FIG. 7 is an enlarged side elevational view of the pinch rollers of FIG. 1a;

FIG. 8 is a side view of a piece of finished braided hose with portions broken away to show the different layers of plies and material thereof; and FIG. 9 is a cross-sectional view taken on line 9—9 of FIG. 8.

Turning now to the details of construction, FIG. 2 shows a vertical sectional view through the extruder 10 of FIG. 1. Elastomeric stock 11 is moved forward by a conventional feeding screw 12 through a breaker plate 13. The stock 11 is then guided by a nose 14 into a forming die 15 and then onto the exterior of a rigid mandrel 16. This forms the interior lining 17 of the final product.

Inasmuch as both the inner and outer surfaces of lining 17 must be lubricated, a suitable lubricant is pumped into an inlet stem 20 which connects with a passage 21 in a lubricating die 22. Passage 21 in turn connects with an annular groove 23 which feeds the lubricant through an annular gap 24, thus to reach the exterior surface of lining 17. We have found that the annular gap 24 must be very small, in the order of .001 to .0015 in.

Any lubricant may be used that is inert to the hose material and liquid at the maximum operating temperature of the apparatus (about 400° F.). We have found glycerine to be a suitable lubricant. Another lubricant suitable for the purpose is one chosen from the group of polyalkalene glycols and their derivatives and marketed by Carbide and Carbon Chemicals Company as "Ucon" oil 50 HB-5100.

FIG. 3, a horizontal sectional view taken on the horizontal center-plane through extruder 10, illustrates the means by which the inside surface of lining 17 is lubricated. Lubricant is pumped into an inlet stem 25, which is fitted into breaker plate 13. The lubricant passes through a passage 26 in breaker plate 13 and then through another passage 27 at right angles to passage 26. Finally, this interior lubricant is forced into an annular groove 30 which connects with another annular groove 31 and then onto the interior surface of lining 17. Annular groove 30 is formed when nose 14 is screwed onto breaker plate 13 by means of threads 32, as illustrated in FIG. 2. The lubricant which has been forced into annular groove 30 passes into annular groove 31 and completes the lubrication of lining 17. Since lining 17 is lubricated on both inner and outer surfaces, it can safely move along mandrel 16 and through the curing tube 33.

Mandrel 16 maintains the extruded shape of lining 17 until the lining can be partially cured. Lining 17 must be partially cured before the application of the braid to prevent any change in shape during the actual braiding operation. The partial cure must be sufficient to permit the lining to hold its shape, but not so much as to lead to scorching of the lining when the entire finished hose is put through the final curing tube, as will be hereinafter described.

Mandrel 16 is screwed into breaker plate 13 by means of threads 34, as illustrated in FIGS. 2 and 3. Mandrel 16 has an undercut 35 commencing at annular groove 30 and extending to a series of serrations 36 (FIG. 2). Undercut 35 cooperates with a surface 38 of nose 14 to form annular lubricating groove 31. Serrations 36 are required to provide an even distribution of the interior lubricant after it is forced forward through annular grooves 30 and 31. We have found that this function is performed satisfactorily when these serrations 36 consist of approximately 30 evenly spaced grooves, each approximately .003 in. deep.

It will be noted that breaker plate 13 performs a variety of functions. Besides supporting mandrel 16, it is used to feed in required lubricants, to furnish necessary back pressure in connection with the extrusion of the elastomeric stock, and to aid in the introduction of vacuum pressure, as will be hereinafter described.

The pressure generated by the extruder 10 forces the thus lubricated lining 17 through curing tube 33 (FIG. 1). Heated oil circulates through a jacket 37, providing heat to cure the lining 17 partially as has been previously explained. Curing tube 33 (FIG. 2) is flared at its near end 40 to cooperate with the conically tapered end 41 of lubricating die 22. Curing tube 33 is held in snug engagement by means of a fitting 42 and a threaded sleeve 43, all as illustrated in FIG. 2.

At the far end of curing tube 33 we have provided a restrictor or snubber 44, as shown in FIG. 1 and, in detail, in FIG. 4. Snubber 44 serves two purposes. It creates the required back pressure to prevent expansion of the elastomeric stock during the above-mentioned partial curing and, at the same time, it removes excess lubricant from the exterior surface of the extruded lining 17. The actual radial pressure is exerted by a stainless steel constricting sleeve 45 which is held in position by a housing 46 of the snubber 44. It is sleeve 45 which creates the necessary back pressure. Sleeve 45 is disclosed here as a separate piece, but it could be made integral with the snubber housing 46.

Due to the motion of the lining 17 through curing tube 33, lubricant accumulates in an annular groove 47 and is released by four vent holes 50 spaced 90° apart. However, constricting sleeve 45 also tends to stop the lubricant on the surface between mandrel 16 and lining 17. Since lining 17 continues to slide on mandrel 16 and, therefore, must stay lubricated, mandrel 16 is provided with serrations 51 to permit this required lubricant to get past the snubbing point. Successful results are achieved when the serrations 51 consist of 19 evenly spaced grooves around the periphery of mandrel 16.

The partially cured lining 17 now travels on mandrel 16 towards the braider 52, as shown in FIG. 1a. The outer surface of the lining 17 is exposed for any desired length to permit the application of cements or other adhesives if so desired. It is also possible to use this exposed length to check the synchronization of the output rate of the extruder 10 with the speed of the braider 52.

Extruders characteristically fail to give constant delivery, exhibiting a tendency to pulsate. This becomes critical when extruding over a braided construction, because changes in pressure change the stretch of the braided construction and upset the synchronized output rate of the process. Thus, although the lining 17 has, up to this point, been pushed forward by extruder 10, after applying the braid, the product must be pulled forward in order to achieve constant speed and a uniform product.

Pulling on a braided construction would cause undue binding and, hence, we have provided longitudinal stabilizing cords 53 (see FIGS. 1a, 5 and 6) to overcome this problem. These longitudinal stabilizing cords 53 are fed in from spools 54 and 55, as shown in FIGS. 1a and 6, and result in the constructions shown in FIGS. 8 and 9. Preferably four cords of the same material as the braid are spaced 90° apart around the periphery of lining 17. This is achieved by taking two cords 53 from each of the two spools 54 and 55 and passing them through eyelets 56 and 57, as shown in FIG. 6. The two sets of two longitudinal stabilizing cords 53 are then passed through eyelets 60, 61, 62 and 63, as shown in FIG. 6, to achieve the desired peripheral spacing. Spools 54 and 55 may be conveniently attached to the back of braider 52 by brackets 64 and 65. Although four cords have been shown, more or less cords might be used depending upon the characteristics of the product.

Following the application of the longitudinal stabilizing cords 53, the braid 68 is applied by braider 52 in the conventional manner.

Most fibers have a tendency to pick up moisture, and since the braid and cover are cured together, this moisture would produce blisters in the final product. All spools must, therefore, be thoroughly dried to prevent any such pickup of moisture. To accomplish this we have provided four two hundred watt infra-red bulbs 66 disposed around braider 52, as shown in FIG. 1a.

Performing the braiding operation for any length of time exerts constricting action on mandrel 16 due to the tension in the cords being applied. This causes an accumulation of lubricant behind the braiding point 67. (See FIG. 5.) To release this accumulation of lubricant we have drilled three small holes 70 into mandrel 16 just before braiding point 67. Holes 70 preferably are spaced 120° apart. These small holes 70 lead into an annular space 69 between mandrel 16 and a capillary tube 71 which will be described below.

A vacuum pump is connected to an inlet stem 72, as shown in FIG. 2. Inlet stem 72 is connected to a passage 73 in breaker plate 13 which leads to the annular space 69 between the capillary tube 71 and mandrel 16. The vacuum pressure applied at inlet stem 72 (FIG. 2) produces sufficient suction at holes 70 (FIG. 5) to release the excessive accumulation of lubricant. A vacuum seal 78 made of a suitable material should be provided as shown in FIG. 5.

As the braid 68 is applied, the product is pulled past point 67 through a second extruder 74. The cover 75 is then applied, as illustrated in FIG. 5. The final product is as shown in FIGS. 8 and 9.

Elastomeric stock 11 is moved forward in this second extruder 74 by a feeding screw 76, which forces the stock into a cross head 77. It then flows around a guide pin 80 into a forming die 81, all as shown in FIG. 5. At the extruding point 82 the now formed cover 75 is applied over the braid 68 and moves forward as a unit.

A lubricating die 83 attached to forming die 81 by means of threads 84 is provided to facilitate the necessary exterior lubrication. An inlet stem 85 connects with a passage 86 which, in turn, connects with an annular gap 87, thereby to lubricate the exterior surface of cover layer 75.

To insure good adhesion between the braid 68 and the cover layer 75, it is desirable that the guide pin 80 be subjected to vacuum pressure to prevent air from being trapped between braid 68 and cover layer 75. This is accomplished in our apparatus by means of a vacuum head 90. A vacuum pump is connected to an inlet stem 91, as shown in FIG. 5. Inlet stem 91 is attached to vacuum head 90. It connects with a passage 92 which, in turn, connects with an annular groove 93. Groove 93 in turn connects with four small holes 98 in guide pin 80. Vacuum head 90 is sealed off by an O ring 94 and a sealing ring 95. The O ring 94 is held in position by a retaining washer 96 which is fastened by means of screws 97. Sealing ring 95 is held in position by a retaining ring 100 which is fastened to vacuum head 90 by means of screws 101. Guide pin 80 is screwed into cross head 77 by means of threads 102 and the vacuum head 90 is itself maintained in position by means of bolts 103.

The braided hose is pulled past the braiding point 67 by means of a capstan drive 104, as shown in FIG. 1a. A small pulley 108 is provided to wrap the finished hose around to insure against slippage due to the presence of the required lubricant. A pair of rollers 109 serves to prevent slippage around the capstan wheel.

It would be desirable to let the hose travel on mandrel 16 right up to the capstan 104, but it has been demonstrated that this is impractical because the pull on the braid causes something like a "cable lock" on the mandrel 16. This lock becomes so effective that a braided construction could not move and would finally break. The mandrel 16, therefore, is terminated at a point about ½ in. past the second extruding point 82, as illustrated in FIG. 5.

Since the inner surface of lining 17 must be supported while being cured after the application of the cover layer 75, the mandrel 16 is supplemented by fluid under pressure brought to this point by the capillary tube 71 above-mentioned. Capillary tube 71 is attached at one end to a fitting 99 cooperating with breaker plate 13 (FIGS. 2 and 3) and extends within mandrel 16 to its termination 105 (FIG. 5). The end 105 of capillary tube 71 is supported by a steel fitting 106 which is screwed into mandrel 16 by means of threads 107.

The liquid used to form this "fluid mandrel" is a suitable lubricant, as, for example, the above mentioned "Ucon" oil 50 HB-5100, and is pumped into an inlet stem 110, as shown in FIG. 3. Inlet stem 110 connects with a passage 111 in breaker plate 13 and fitting 99 which, in turn, feeds the oil directly into the capillary tube 71 at point 112. This oil under pressure flows for the full length of the capillary tube 71 into the interior of the braided hose. (See FIG. 5.) The interior of lining 17, already shaped due to the partial curing, permits the fluid mandrel to serve merely as a support.

In order to build up the required internal pressure, this flow of oil under pressure out from the end 105 of the capillary tube 71 must be stopped. Thus, two 6 in. spring-loaded aluminum rollers 113 and 114 are mounted as shown in FIG. 1a between the end of the final curing tube 115 and the capstan drive 104. These rollers 113 and 114 are shown in detail in FIG. 7. The rollers 113 and 114 are rotatably supported by brackets 116 and are connected by two springs 117. The finally cured braided hose 120 is pinched by rollers 113 and 114, thus stopping the flow of oil and developing the required fluid pressure within the tubing. The tension in springs 117 can be adjusted by an adjusting wheel 121, a screw 122 and a bracket 123. The internal pressure thus produced may be measured by means of a dial indicator 124, mounted as shown in FIG. 1a.

After the second extruder 74 applies the cover layer 75, the braided hose supported by the internal fluid pressure as above described is pulled by capstan drive 104 through a final heated curing tube 115. The braided hose then continues through the pinching rollers 113 and 114 and then through the capstan 104, finally emerging as the finished product 120.

The final curing tube 115 is flared at its near end 125 to cooperate with the conically tapered end 126 of lubricating die 83. Final curing tube 115 is held in snug engagement by means of a fitting 127 and a threaded sleeve 128, all as illustrated in FIG. 5.

*Illustrative Example*

Successful results have been achieved using our method and apparatus when the following compositions were used to form the lining and the cover layer.

Composition of lining: Parts
GR-S ------------------------------- 30
"Paracril B," brand of butadiene-acrylonitrile rubber ------------------------------- 180
Carbon black ------------------------------- 175
Zinc oxide ------------------------------- 5.4
Accelerator ------------------------------- 5
"Resinex," brand of polymerized aromatic resin rubber plasticizer ------------------------------- 15
Activator ------------------------------- 4.2
"Altax," brand of benzothiazyl disulfide ------------------------------- 2
Sulfur ------------------------------- 4
Antioxidant ------------------------------- 5
Plasticizer ------------------------------- 20

Composition of cover: Parts
Neoprene ------------------------------- 250
Whiting ------------------------------- 100
Carbon black ------------------------------- 150
Zinc oxide ------------------------------- 2.3
Antioxidant ------------------------------- 6
Activator ------------------------------- 6.3
Magnesia ------------------------------- 10
Resin ------------------------------- 25
Extender ------------------------------- 20
Accelerator ------------------------------- 1

When these compositions were used, the temperature of extruder 10 was kept at 200° F. The partial curing tube 33 was maintained at 350° F. The second extruder 74 operated at 240° F. and the final curing tube 115 was held between 340° and 380° F.

The finished braided hose 120 had an outer diameter of 0.5 inch and an inner diameter of 0.25 inch. Rayon cord was used to make the braid. The rate of production achieved was four feet of braided hose per minute.

We have thus disclosed a method and apparatus for continuously curing and extruding braided hose. From the foregoing description it is evident that the process and apparatus of the invention are susceptible of many modifications. Thus, it should be understood that the specific embodiment described herein is not to be considered in a limiting sense, as other forms or modifications of the invention may come within the scope of the following claims.

Having thus described our invention, what we claim and desire to protect by Letters Patent is:

1. An apparatus for continuously forming braided hose comprising, in combination, a rigid mandrel having a channel therethrough, a first extruder for forming a first layer of elastomeric hose material around said mandrel, a curing tube surrounding said mandrel at a point past said first extruder for partially curing said first layer, means adjacent said mandrel for applying a plurality of longitudinal reinforcing cords along the periphery of said partially cured first layer, a braider adjacent said mandrel for applying braided reinforcing cord over said longitudinal reinforcing cords, a second extruder for forming a second layer of elastomeric hose material around the thus reinforced first layer, said mandrel terminating just beyond the point of extrusion of said second layer of hose material, means for pulling said reinforced first layer at a uniform rate of travel through said second extruder, a tube passing through the interior of said mandrel for introducing fluid under pressure into the interior of the resulting product to support the inner surface thereof following the point of termination of said mandrel, and means for finally curing said resulting product.

2. An apparatus for continuously forming braided hose as described in claim 1, in which said longitudinal reinforcing cord applying means comprise a plurality of rotatably mounted spools on which said cords are wound and uniformly spaced eyelets around the periphery of said partially cured first layer for directing the application of said cords.

3. An apparatus for continuously forming braided hose as described in claim 1, in which the exterior surface of said mandrel is longitudinally serrated at the point of formation of said layer to facilitate even distribution of a lubricant over said exterior surface.

4. In an apparatus for continuously forming braided hose as described in claim 1, a snubber surrounding said mandrel and positioned immediately following said curing tube, said exterior surface of said mandrel being longitudinally serrated at the point of application of pressure by said snubber to facilitate passage of lubricant on the exterior surface of said mandrel beyond said snubber.

5. In an apparatus for continuously forming braided hose as described in claim 1, a breaker plate in said first extruder for furnishing back pressure, said breaker plate having a plurality of inlet stems for introducing required lubricants and vacuum pressure and being adapted to support said mandrel.

6. In an apparatus for continuously forming braided hose as described in claim 5, means to remove excess lubricant from the exterior surface of said mandrel just prior to said application of said braided reinforcing cord, said means comprising an inlet stem in said breaker plate for the application of vacuum pressure, said inlet stem connecting with said channel through said mandrel and thence with a plurality of holes in said mandrel located at a point just prior to said application of said braided reinforcing cord.

7. An apparatus for continuously forming braided hose as described in claim 5, comprising an inlet stem in said breaker plate for supplying said fluid-introducing tube with said fluid, said tube being adapted to discharge said fluid into said interior of said hose at said point of termination of said mandrel, and a pair of spring actuated rollers located at opposite sides of the finally cured hose and at a point past said final curing means for pinching said hose, thereby to build up pressure therein to support said hose internally during the final curing.

References Cited in the file of this patent

UNITED STATES PATENTS

| | | |
|---|---|---|
| 897,339 | Bayne et al. | Sept. 1, 1908 |
| 2,513,106 | Prendergast | June 27, 1950 |
| 2,616,128 | Barry et al. | Nov. 4, 1952 |
| 2,620,515 | Olson | Dec. 9, 1952 |
| 2,644,983 | Curtiss | July 14, 1953 |
| 2,666,947 | Shaw | Jan. 26, 1954 |
| 2,763,316 | Stahl | Sept. 18, 1956 |
| 2,800,683 | Teichmann | July 30, 1957 |
| 2,810,424 | Swortswelter et al. | Oct. 22, 1957 |
| 2,814,071 | Allan et al. | Nov. 26, 1957 |
| 2,888,954 | Gates | June 2, 1959 |
| 2,899,982 | Harpfer | Aug. 18, 1959 |